United States Patent
Yang et al.

(10) Patent No.: US 10,401,470 B2
(45) Date of Patent: Sep. 3, 2019

(54) METHOD AND APPARATUS FOR LOCATING OF A MOBILE DEVICE

(71) Applicant: SIGNIFY HOLDING B.V., Eindhoven (NL)

(72) Inventors: Hongming Yang, Eindhoven (NL); Armand Michelmarie Lelkens, Heerlen (NL); Julius Everardus Petrus Ebing, Eindhoven (NL); Paulus Maria Johannes Oppeneer, Eindhoven (NL); Xiangyu Wang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 156 days.

(21) Appl. No.: 15/503,587

(22) PCT Filed: Aug. 11, 2015

(86) PCT No.: PCT/EP2015/068460
§ 371 (c)(1),
(2) Date: Feb. 13, 2017

(87) PCT Pub. No.: WO2016/023901
PCT Pub. Date: Feb. 18, 2016

(65) Prior Publication Data
US 2017/0234962 A1     Aug. 17, 2017

(30) Foreign Application Priority Data

Aug. 12, 2014     (EP) .................................. 14180653

(51) Int. Cl.
*G01S 5/02*     (2010.01)
*G01S 13/87*    (2006.01)
(Continued)

(52) U.S. Cl.
CPC .......... *G01S 5/0252* (2013.01); *G01S 5/0221* (2013.01); *G01S 5/04* (2013.01); *G01S 5/14* (2013.01);
(Continued)

(58) Field of Classification Search
CPC ........ G01S 5/0252; G01S 5/0221; G01S 5/04; G01S 5/14; G01S 13/74; G01S 13/878; H04W 64/003
(Continued)

(56) References Cited

U.S. PATENT DOCUMENTS 7,852,205 B2     12/2010   Huseth et al.
7,966,021 B2      6/2011   Dietrich et al.
(Continued)

FOREIGN PATENT DOCUMENTS

CN     10528282 A  *  7/2014  ............ H04W 12/06
EP      1811801 A1     7/2007
(Continued)

OTHER PUBLICATIONS

Isoda, Yoshinori, et al., "Indoor Presence System Using Wireless Lan," Technology Reports, NTT Docomo Technical Journal, vol. 9, No. 2, Nov. 2009 (6 Pages).

*Primary Examiner* — Mong-Thuy T Tran
(74) *Attorney, Agent, or Firm* — Meenakshy Chakravorty

(57) ABSTRACT

As at least part of a location network, there is provided a trigger node and multiple listening nodes. The trigger node wirelessly transmits a trigger signal to the mobile device, the trigger signal being configured to cause the mobile device to wirelessly emit a signal in response to receiving the trigger signal. The listening nodes listen for the response signal that was transmitted from the mobile device in response to the trigger signal, and thereby at each respective one of a plurality of the listening nodes that wirelessly receive the
(Continued)

response signal from the mobile device, a respective measurement is taken of the response signal as received at the respective listening node, for use in performing a localization to determine the location of the mobile device based on one or more of these measurements.

10 Claims, 3 Drawing Sheets

(51) Int. Cl.
*H04W 64/00* (2009.01)
*G01S 5/04* (2006.01)
*G01S 5/14* (2006.01)
*G01S 13/74* (2006.01)

(52) U.S. Cl.
CPC ............ *G01S 13/74* (2013.01); *G01S 13/878* (2013.01); *H04W 64/003* (2013.01)

(58) Field of Classification Search
USPC .................................. 455/456.1–456.6, 457
See application file for complete search history.

(56) References Cited

U.S. PATENT DOCUMENTS

| | | | | |
|---|---|---|---|---|
| 2007/0247366 | A1* | 10/2007 | Smith | G01S 5/021 342/464 |
| 2009/0280825 | A1 | 11/2009 | Malik et al. | |
| 2012/0095779 | A1 | 4/2012 | Wengrovitz et al. | |
| 2012/0230313 | A1 | 9/2012 | Alizadeh-Shabdiz | |
| 2012/0244875 | A1 | 9/2012 | Cardona et al. | |
| 2013/0045759 | A1* | 2/2013 | Smith | H04W 4/029 455/456.6 |
| 2014/0218340 | A1* | 8/2014 | Rai | G01S 17/026 345/175 |
| 2014/0335897 | A1* | 11/2014 | Clem | G08G 1/0112 455/456.3 |
| 2014/0362713 | A1* | 12/2014 | Agarwal | H04W 24/08 370/252 |
| 2015/0031388 | A1* | 1/2015 | Chatterjee | H04W 4/021 455/456.1 |
| 2015/0141005 | A1* | 5/2015 | Suryavanshi | H04L 67/125 455/434 |
| 2015/0373503 | A1* | 12/2015 | Jovicic | G01S 5/0252 455/456.1 |
| 2017/0139032 | A1* | 5/2017 | Rol | G01S 5/02 |

FOREIGN PATENT DOCUMENTS

| | | |
|---|---|---|
| EP | 2034673 A2 | 11/2009 |
| EP | 2527858 A1 | 11/2012 |

* cited by examiner

METHOD AND APPARATUS FOR LOCATING OF A MOBILE DEVICE

CROSS-REFERENCE TO PRIOR APPLICATIONS

This application is the U.S. National Phase application under 35 U.S.C. § 371 of International Application No. PCT/EP2015/068460, filed on Aug. 11, 2015, which claims the benefit of European Patent Application No. 14180653.9, filed on Aug. 12, 2014. These applications are hereby incorporated by reference herein.

TECHNICAL FIELD

The present disclosure relates to localization, i.e. the process of determining the location of a mobile device based on a network of wireless nodes.

BACKGROUND

In an indoor positioning system, the location of a wireless device such as a mobile user terminal can be determined with respect to a location network comprising a plurality of wireless reference nodes, sometimes also referred to as anchor nodes. These anchors are wireless nodes whose locations are known a priori, typically being recorded in a location database which can be queried to look up the location of a node. The anchor nodes thus act as reference nodes for localization. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

Another localization technique is to determine the location of mobile device based on a "fingerprint" of a known environment. The fingerprint comprises a set of data points each corresponding to a respective one of a plurality of locations throughout the environment in question. Each data point is generated during a training phase by placing a wireless device at the respective location, taking a measurement of the signals received from or by any reference nodes within range at the respective location (e.g. a measure of signal strength such as RSSI), and storing these measurements in a location server along with the coordinates of the respective location. The data point is stored along with other such data points in order to build up a fingerprint of the signal measurements as experienced at various locations within the environment. Once deployed, the signal measurements stored in the fingerprint can then be compared with signal measurements currently experienced by a mobile device whose location is desired to be known, in order to estimate the location of the mobile device relative to the corresponding coordinates of the points in the fingerprint. For example this may be done by approximating that the device is located at the coordinates of the data point having the closest matching signal measurements, or by interpolating between the coordinates of a subset of the data points having signal measurements most closely matching those currently experienced by the device. The fingerprint can be pre-trained in a dedicated training phase before the fingerprint is deployed by systematically placing a test device at various different locations in the environment. Alternatively or additionally, the fingerprint can built up dynamically by receiving submissions of signal measurements experienced by the actual devices of actual users in an ongoing training phase.

As well as indoor positioning, other types of positioning system are also known, such as GPS or other satellite-based positioning systems in which a network of satellites acts as the reference nodes. Given signal measurements from a plurality of satellites and knowledge of those satellites' positions, the location of the mobile device may be determined based on similar principles.

The determination of the mobile device's location may be performed according to a "device-centric" approach or a "network-centric" approach. According to a device centric approach, each anchor or reference node emits a respective signal which may be referred to as a beacon or beaconing signal. The mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

There are various reasons why it may be desirable to be able to detect the location of a wireless device, such as to provide location based services. For instance, one application of a positioning system is to automatically provide a wireless mobile device with access to control of a utility such as a lighting system, on condition that the mobile device is found to be located in a particular spatial region or zone associated with the lighting or other utility. E.g. access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments. E.g. if a smart phone can be located in a shop environment, interesting advertisements can be sent to the mobile phone depending on its location.

SUMMARY

The performance of localization technologies, in terms of accuracy and delay, is often limited due to a small number of anchor nodes being available and/or limited traffic between the mobile device and the anchor nodes.

For instance, one limiting factor for the performance of such technologies can be the fact that the RSSIs are of a random nature due to the radio propagation properties. Hence, the accuracy of such systems can sometimes be limited when there is only a small number of RSSI measurements available. Hence, it may be desirable to collect more RSSIs to achieve higher accuracy. Conventionally, to collect RSSIs, there has to be a direct radio communication packet exchange between the mobile device and each of the anchor nodes. This means that in the case where we want to collect a lot of RSSIs in a system with a large number of anchor nodes, there would be a lot of data traffic flooding the communication channel.

Another potential limiting factor can be the number of anchor nodes. Many existing solutions use a small number of anchor nodes. For instance, in Wi-Fi based networks, it is common practice to use access points (APs) as the anchor nodes. The APs are natural choices of anchor nodes, since they typically have fixed and known locations and most of the data traffic goes through an AP especially in the infrastructure mode. However, the density of AP deployment is typically quite low. A mobile device can normally set up a link with only a few APs in practice. Hence the positioning accuracy can often be limited by the small number of anchor nodes available.

With advances in wireless radio communications, there are more-and-more connected systems with an increasing density of communication nodes that can be used as anchor nodes. E.g. it has been proposed to exploit a wireless node incorporated into each of a plurality of luminaires of a lighting system, such that each luminaire also acts as an anchor node for localization. However, one issue that still remains to be solved is how, in practice, one can collect a significant number of RSSIs from the dense anchor nodes, preferably without flooding the network with an undue amount of traffic.

Thus the performance of location systems such as indoor location networks often suffers from the lack of sufficient capturing of RSSI data (or other such signal measurements) from sufficient number of anchor nodes. It would be desirable to provide a solution to such issues.

According to one aspect disclosed herein there is taught a method in which, as at least part of a location network, there is provided a trigger node for transmitting wirelessly to the mobile device, and multiple listening nodes (i.e. receiving anchor nodes) for receiving wirelessly from the mobile device. The method comprises: using the trigger node to wirelessly transmit a trigger signal to the mobile device, the trigger signal being configured to cause the mobile device to wirelessly emit a response signal in response to receiving the trigger signal; and using the listening nodes to listen for the response signal that was transmitted from the mobile device in response to the trigger signal. At each respective one of a plurality of the listening nodes that wirelessly receive the response signal from the mobile device, a respective measurement is taken of the response signal as received at the respective listening node. A localization can then be performed to determine the location of the mobile device based on one or more of said measurements.

As the signal emitted from the mobile device is not just left to chance, but rather explicitly triggered by a signal from the trigger node, then it can be ensured that at least a certain desired number of instances of the emitted signal is made available for use in the localization.

In embodiments, said response signal is not emitted from the mobile device except when triggered by said trigger signal. I.e. the mobile device only emits the response signal in response to receiving the trigger signal from the trigger node. This can help prevent the network being flooded with too many signals.

Another consideration recognised herein, which affects performance characteristics of positioning systems such as indoor positioning systems, is that one could achieve smoother positioning results if the RSSIs or other such measurements were collected more evenly over time, rather than in a pattern of bursts. E.g. if the collection of RSSI is dependent on the communication traffic initiated from the mobile device, such as a mobile phone, the traffic will hardly be distributed evenly over time. Thus it would be desirable to be able to collect RSSIs at regular intervals, rather than in a burst fashion or dependent on the real traffic of communication nodes.

Hence in embodiments, the trigger node transmits the trigger signal periodically at regular intervals, causing the mobile device to wirelessly emit the response signal each time it receives the trigger signal (and therefore also periodically).

In embodiments, the response signal from the mobile device may be addressed to a target destination (e.g. the trigger node), and the listening nodes are not the target destination of the response signal. I.e. the listening nodes "sniff" for the response signal even though it is not addressed to them.

In embodiments, the listening nodes are not access points. E.g. each of the listening nodes may be incorporated into a respective luminaire.

In embodiments, the triggered response signal may be a dedicated signal for the purpose of localization. Nonetheless, it may also be desirable to further increase the number of signal measurements available for localization by arranging all listening anchor nodes to capture ("sniff") all signals (e.g. all packets) emitted from the mobile device, whether dedicated localization signals or other signals such as user traffic.

In yet further embodiments, the mobile device may wirelessly emit one or more other signals in addition to said response signal; and each of the listening nodes may listen for the response signal and said other signals even if not addresses to the listening node, in order to take respective measurements of the response signal and at least one of the other signals for use in performing said localization. In this case, in one particularly advantageous embodiment, the trigger node may wirelessly transmit the trigger signal to the mobile device in response to determining that the mobile device has not emitted any of said other signals within a predetermined time window (and preferably only in response to this).

In embodiments, a proximity of the mobile device to another entity may be detected and the trigger node may wirelessly transmit the trigger signal to the mobile device in response to detecting that the mobile device is within a predetermined proximity of the other entity.

In embodiments, the trigger node may be used to detect a proximity of a user of the mobile device and/or the mobile device to another entity and wirelessly transmit the trigger signal to the mobile device in response to detecting that the user and/or mobile device is within a predetermined proximity of the other entity. According to another aspect disclosed herein, there is provided apparatus comprising: a controller configured to control a trigger node to wirelessly transmit a trigger signal to a mobile device, the trigger signal being configured to cause the mobile device, in response to receiving the trigger signal, to wirelessly emit a response signal to be received by a plurality of listening nodes of a location network; and a location engine configured to receive respective measurements of the response signal as received at least some said plurality of listening nodes, and to perform a localization to determine the location of the mobile device based on one or more of said measurements.

According to another aspect disclosed herein, there is provided a location network for determining a location of a mobile device, the location network comprising: a trigger node configured to wirelessly transmit a trigger signal to the mobile device, the trigger signal being configured to cause the mobile device to wirelessly emit a response signal in response to receiving the trigger signal; and multiple listening nodes configured to listen for the response signal being transmitted from the mobile device in response to the trigger signal, and at each respective one of a plurality of the listening nodes that wirelessly receive the response signal from the mobile device, to thereby take a respective measurement of the response signal as received at the respective listening node; and a location engine configured to perform a localization to determine the location of the mobile device based on one or more of said measurements.

According to another aspect disclosed herein, there is provided a computer program stored on one or more computer-readable storage media and/or downloadable from a computer network, and configured so as when executed on one or more processors to perform an operation of: controlling a trigger node to wirelessly transmit a trigger signal to a mobile device, the trigger signal being configured to cause the mobile device, in response to receiving the trigger signal, to wirelessly emit a response signal to be received by a plurality of listening nodes of a location network; and a location engine configured to receive respective measurements of the response signal as received at least some said plurality of listening nodes, and to perform a localization to determine the location of the mobile device based on one or more of said measurements.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF PREFERRED EMBODIMENTS

Figure 1:
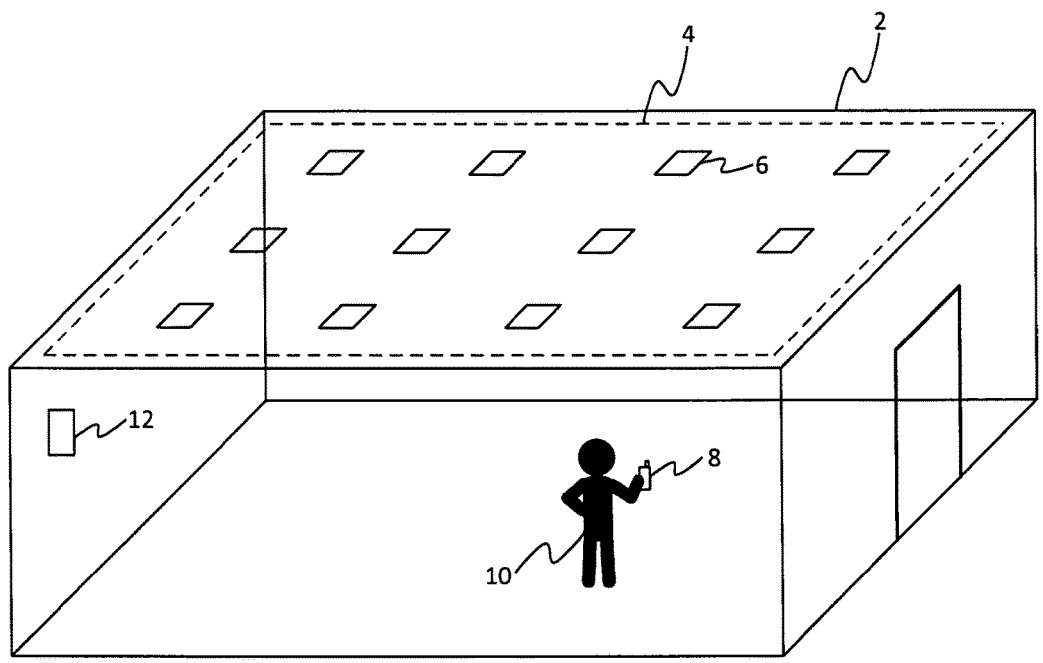
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positioning system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations or be dedicated anchor nodes of an indoor positioning system, as long as their locations can still be known. For example the reference nodes could instead be access points 12 of a WLAN or base stations of a cellular network used for a secondary purpose of positioning, or could be other mobile devices that have already been positioned, or even satellites of a satellite based positioning system. The following will be described in terms of the reference nodes 6 being anchor nodes of an indoor positioning system or the like, but it will be appreciated this is not necessarily the case in all possible embodiments. Also, while the disclosure is described in terms of wireless radios, the disclosed techniques may be applied to other modalities such as visible light, ultrasound or other acoustic waves, etc.

The environment 2 is occupied by a user 10 having a wireless device 8 disposed about his or her person (e.g. carried or in a bag or pocket). The wireless device 8 may take the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 10, being or object about which it is disposed.

Figure 2:
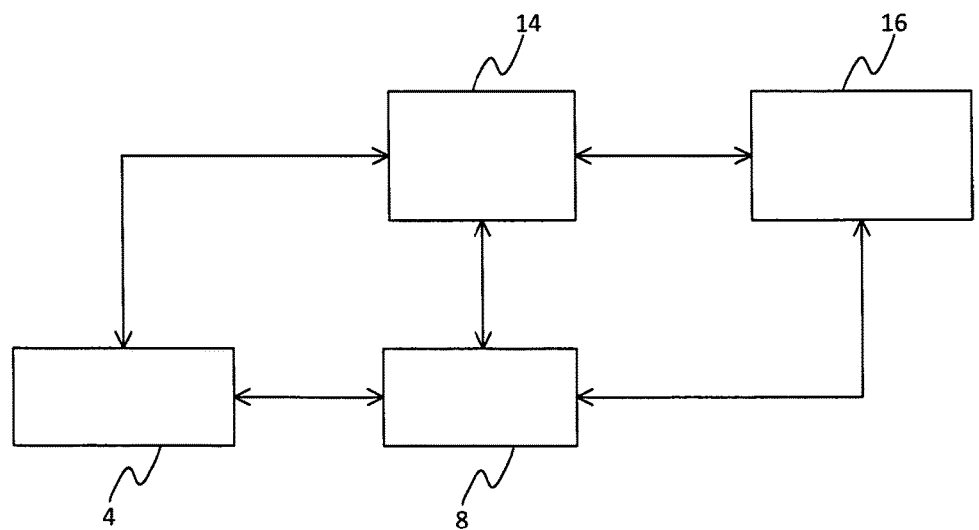
FIG. 2 is a schematic block diagram of a system for providing a location based service.

Referring to FIGS. 1 and 2, the environment 2 optionally comprises at least one wireless access point, router or gateway 12 or the like, enabling communication with a location server 14 (comprising one or more server units at one or more sites). The one or more wireless access points 12 are placed such that each of the anchor nodes 6 is within wireless communication range of at least one such access point or gateway 12. The following will be described in terms of one access point 12, but it will be appreciated that in embodiments the same function may be implemented using one or more access points, wireless routers and/or gateways or the like distributed throughout the environment 2, or any other means for communicating with the server 14. The wireless access point or gateway 12 (or the like) is coupled to the location server 14, whether via a local connection such as via a local wired or wireless network, or via a wide area network or internetwork such as the Internet. The wireless access point or gateway 12 is configured to operate according to a short-range radio access technology such as Wi-Fi, Zigbee or Bluetooth, using which each of the anchor nodes 6 is able to wirelessly communicate via the wireless access point or gateway 12 and therefore with the location server 14. Alternatively, the environment 2 need not necessarily comprise any wireless access point, router or gateway 12 or the like. In this case, the nodes may communicate with each other and with the location server either directly or via mesh network, etc. As another alternative, it is not excluded that the anchor nodes 6 could be provided with a wired connection with the location server 14, but the following will be described in terms of a wireless connection via an access point 12 or the like. Some embodiments below may be described in terms of communication via a wireless access point or gateway 12, but it will be appreciated this is not limiting to all possible embodiments.

The mobile device 8 is also able to communicate via the wireless access point or gateway 12 (or the like) using the relevant radio access technology, e.g. Wi-Fi, Zigbee or Bluetooth, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point or gateway 12, e.g. Wi-Fi, Zigbee or Bluetooth, though that is not necessarily the case in all possible embodiments, e.g. the transmission between the mobile device 8 and anchor nodes 6 may alternatively use some dedicated localization radio technology.

Generally any of the communications described in the following may be implemented using any of the above options or others for communicating between the respective entities 6, 8, 12, 14 and for conciseness the various possibilities will not necessarily be repeated each time.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. The respective measurement taken of the respective signal from each detected anchor node 6 may for example comprise a measurement of signal strength (e.g. RSSI), time of flight (ToF), angle of arrival (AoA), and/or any other property that varies with distance or location.

In a network centric approach, the mobile device 8 emits a signal and the anchor nodes 6 listen, detecting an instance of the signal at one or more of those nodes 6 that are currently in range. The respective measurement taken of each instance of the signal from the mobile device 8 may comprise a measure of signal strength (e.g. RSSI) or time of flight (ToF), angle of arrival (AoA), and/or any other property that varies with distance or location. In an example of a hybrid approach, the nodes 6 may take the measurements but then send them to the mobile device 8, or the mobile device 8 may take the measurements but send them to the location server 14.

Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (time or time+date) of transmission to the message. If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement via another channel (e.g. via location server 14).

Any one or a combination of these approaches or others may be applied in conjunction with the system disclosed herein. Whatever approach is chosen, once such a signal measurement is available from or at each of a plurality of the anchor nodes 6, it is then possible to determine the location of the mobile device 8 relative to the location network 4 using a technique such as trilateration, multilateration, triangulation and/or a fingerprint based technique.

In addition, the "absolute" locations of the anchor nodes 6 (or more generally reference nodes) are known, for example from a location database maintained by the location server 14, or by the respective location of each anchor node 6 being stored at the node itself (e.g. and communicated from each relevant nodes to the mobile device 8 in a device centric approach). The absolute location is a physical location of the node in a physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 used in the calculation, it is then possible to determine the "absolute" location of the mobile device 8. Again the absolute location is a physical location of the device in a physical environment or framework, for example a geographic location in terms of the location on a globe or a map, or a location on a floorplan of a building or complex, or any more meaningful real-world frame of reference having a wider meaning than simply knowing the location relative to the location network 4 alone.

In embodiments, the absolute location of the nodes 6 may be stored in a human understandable form and/or the absolute location of the mobile device 8 may be output in a human understandable form. For example, this may enable the user 10 to be provided with a meaningful indication of his or her location, and/or may enable the administrator of a location-based service to define rules for granting or prohibiting access to the service or aspects of the service.

Alternatively it is possible for the location of the nodes 6 and/or mobile device 8 to only ever be expressed in computer-readable form, e.g. to be used internally within the logic of the location based service.

In other embodiments it is not excluded that the location is only ever expressed relative to the location network 4, 6 and not as a more meaningful "absolute" location. For example if each anchor node 6 is integrated or co-located with a respective luminaire and the location is being determined for the purpose of controlling those luminaires, then in some embodiments it may only be necessary to determine the user's location relative to the framework of points defined by the anchor nodes of these luminaires (though in other similar arrangements it may still be desired to define lighting control regions relative to the floorplan of a building or the like).

In a device centric approach the mobile device 8 looks up the locations of the relevant nodes 6 by querying the location server 14 (e.g. via the wireless access point or gateway 12), or alternatively may receive the respective location along with the signal from each node 6. The mobile device 8 then performs the calculation to determine its own location at the device 8 itself (relative to the location network 4 and/or in absolute terms). In a network centric approach on the other hand, the nodes 6 submit the signal measurements they took to the location server 14 (e.g. via the wireless access point or gateway 12), and the location server 14 performs the calculation of the device's location at the server 14 (again relative to the location network 4 and/or in absolute terms). In an example of an assisted or hybrid approach, the mobile device 8 may take the measurements of signals from the nodes 6 but submit them to the location server 14 in a raw or partially processed form for the calculation to be performed or completed there.

Typically a signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access or it is impossible to reach, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

By whatever technique the location is determined, this location may then be used to assess whether the mobile device 8 is granted access to some location-based service or other such function. To this end, there is provided a service access system 16 configured to conditionally grant access to the service in dependence on the absolute location of the mobile device 8. In a device centric approach the mobile device 8 submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

The following are some examples of location-related services or functions that may be provided in accordance with embodiments of the present disclosure:

allowing control of a utility such as lighting from an application running on the mobile device 8, where the user can only control the lighting or utility in a given room or zone when found to be located in that room or zone, or perhaps an associated zone;

providing a navigation service such as an indoor navigation service to the mobile device 8 (in which case the location-related function comprises at least providing the device's absolute location to an application running on the mobile device 8, e.g. which the application may then use to display the user's location on a floor plan or map);

providing location based advertising, alerts or other information to the mobile device 8, e.g. providing the device 8 with information on exhibits as the user 10 walks about a museum, providing the device 8 with information about products as the user 10 walks about a shop or mall, providing the device 8 with access to medical data only if present inside a hospital or specific zone within a hospital, or providing the device 8 with access to complementary media material only if present physically within a movie theatre or the like; and/or accepting location dependent payments from the mobile device on condition that the device 8 is present in a certain region, e.g. payments in shops, payment of road tolls, "pay as you drive" car rental, or entrance fees to venues or attractions.

For instance, in embodiments the service access system 16 is configured to control access to a lighting network installed or otherwise disposed in the environment 2. In this case the environment 2 comprises a plurality of luminaires (not shown) and a lighting control system comprising the access system 16. The luminaires may for example be installed in the ceiling and/or walls, and/or may comprise one or more free standing units. The luminaires are arranged to receive lighting control commands from the controller. In embodiments this may also be achieved via the wireless access point 12 using the same radio access technology that the anchor nodes 6 and/or mobile device 8 use to communicate with the wireless access point or gateway 12, and/or the same radio access technology used to communicate the signals between the mobile device 8 and anchor nodes 6 in order to take the location measurements, e.g. Wi-Fi or Zigbee. Alternatively the lighting controller may communicate with the luminaires by other means, e.g. a separate wired or wireless network. Either way, the access system 16 of the lighting controller is configured with one or more location dependent control policies. For example, a control policy may define that a user 10 can only use his or her mobile device 8 to control the lights in certain region such as a room only when found within that region or within a certain defined nearby region. As another example control policy, the mobile device 8 only controls those luminaires within a certain vicinity of the user's current location.

With regard to security, provided that the localization messages are distributed internally within the localization system 4, 6, 14 security may be less of an issue; but in the case of two-way time of flight messages (RTT) for example, or where the reports are transmitted over a public network, it may be advantageous to provide them with a time-stamp (measurement time) or a nonce and/or to "hash" the messages (digital signature) so as to thwart any replay attacks on the network backbone. The same could be done with the measurement reports sent to the location server 14. Such measures are not essential but may be desirable in embodiments, particularly if the location-based service or functionality is susceptible to abuse or involves financial transactions or the like.

Note that FIG. 2 shows arrows in all directions to illustrate the possibility of either device centric or network centric approaches, but in any given implementation not all the communications shown need be bidirectional or indeed present at all. Network centric, device centric and assisted approaches are described by way of comparison, but the following embodiments will relate to a network centric approach whereby anchor nodes 6 of the location network 4 take measurements of signals received from the mobile device 8 and the location server 14 or other network element performs the localization calculation based on these measurements, or a hybrid approach in which the anchor nodes 6 take the measurements of the signals from the mobile device 8 but return the measurements to the mobile device 8 for the localization calculation to be performed there. In both these scenarios, each of the anchor nodes 6 is acting as a "listening" node which listens for signals to receive from the mobile device 8. In the following therefore, the anchor nodes may be referred to as listening nodes, or "sniffers" (for reasons that will become apparent). The computing entity performing the localization may be referred to as the localization engine, which may be implemented in software and/or hardware whether at the location server 14 or other network element (network centric approach) or at the mobile device 8 (hybrid approach).

As mentioned, the performance of location systems such as indoor location systems often suffers due to a lack of sufficient capturing of RSSI data (or other such signal measurements) at sufficient number of anchor nodes 6. It would be desirable to provide a solution to such issues, but preferably without flooding the communication network with too many communications.

The following provides a system and method to enhance the performance of indoor location networks or other such location systems, by providing a mechanism for externally controlling the occurrence of signals from the mobile device for the purpose of localization, and in embodiments also exploiting the availability of other traffic already being transmitted by the mobile device 8 for other purposes (such as to communicate user content).

Figure 3:
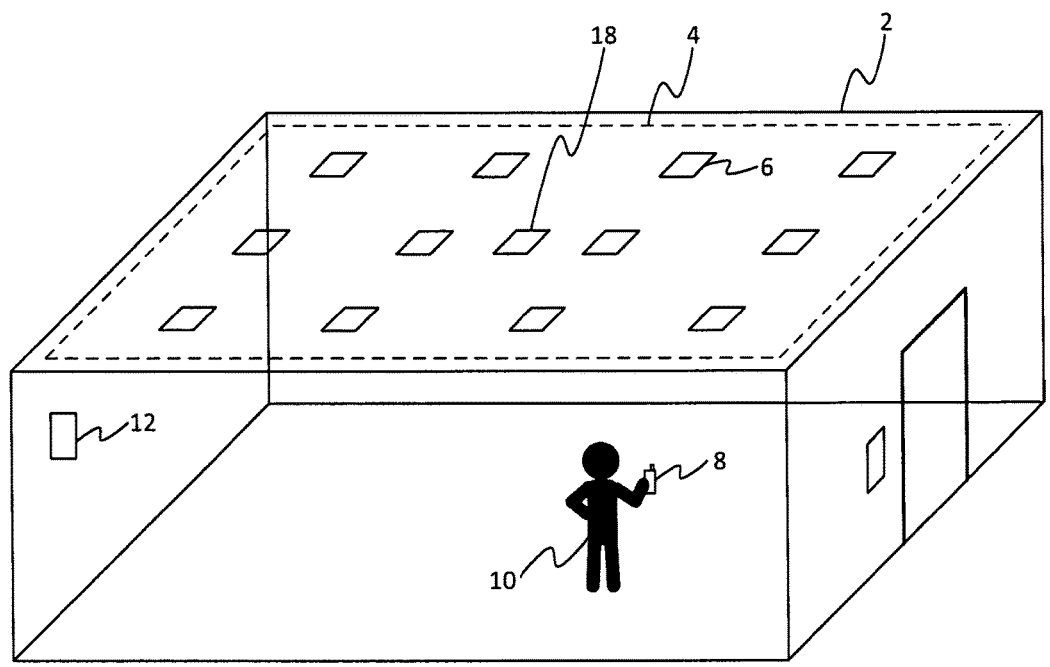
FIG. 3 is another schematic representation of an environment comprising another indoor positioning system.
Figure 5:
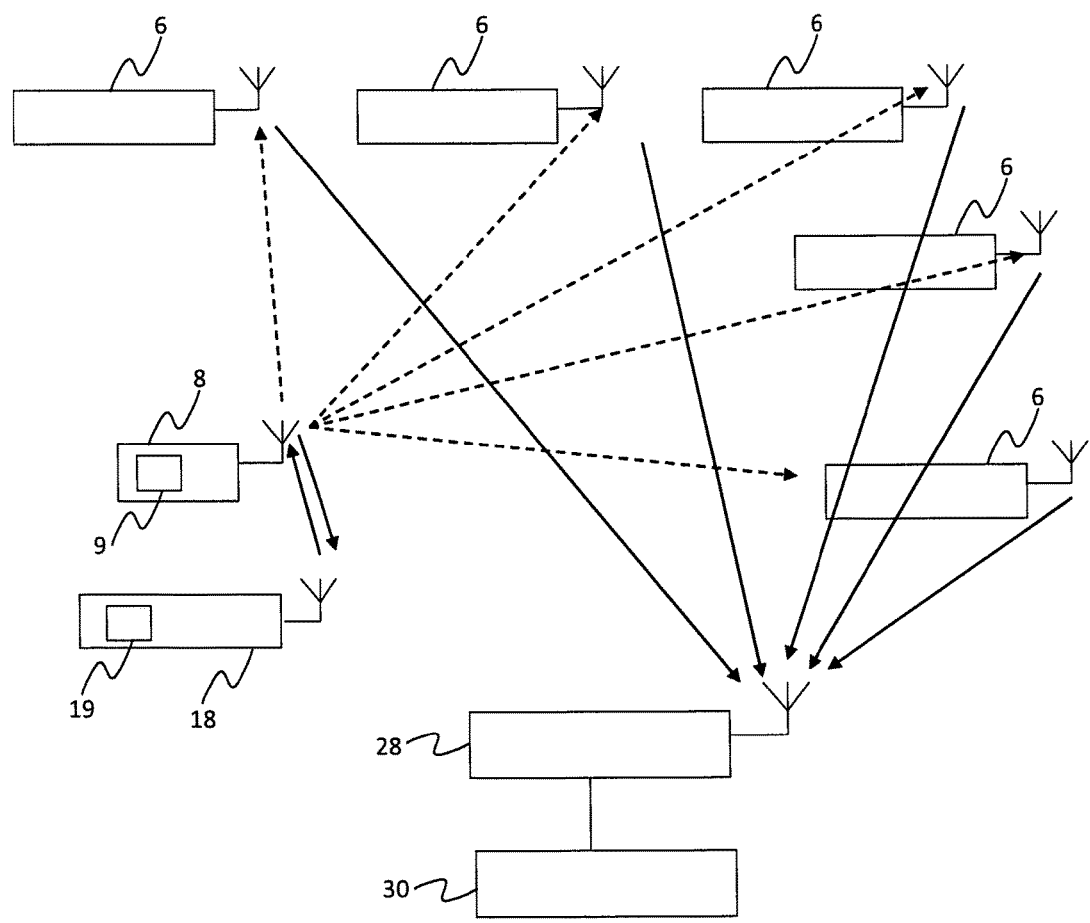
FIG. 5 is a schematic bock diagram of a positioning system.

Referring to FIGS. 3 and 5, the system comprises three parts. The first part is a trigger node 18. The trigger node 18 is arranged to send trigger signals to each target mobile device 8, which react by emitting a signal. The second part consists of a number of radio receivers, the listening anchor nodes 6, which are configured as "sniffers". The functionality of each sniffer 6 is to determine the identification of the mobile device 8 from the emitted signal and derive the RSSIs at the sniffer 6 (or derive another such measurement suitable for use in localization—the following will be described in terms of RSSI but it will be appreciated this is not limiting). Finally, all the RSSI data are communicated to an aggregation node 28, which connects to a location engine 30 to compute the location of each target mobile device 8. The location engine 30 may be implemented at the location server 14 (network centric approach) or at the mobile device 8 (hybrid approach), or at the trigger node 18 or another node, or any combination of these. It may be implemented in software stored in one or more memories of the server 14, mobile device 8 and/or other node and arranged for execution on one or more processors of the server 14, mobile device 8 and/or other node; or may be implemented in dedicated hardware circuitry, or in configurable or reconfigurable circuitry such as a PGA or FPGA, or any combination of these possibilities.

To elaborate, within the location network 4, as well as the listening anchor nodes 6 there is also provided a trigger node 18. The role of the trigger node 18 is to send communication packets to each mobile device 8, with each packet comprising a trigger message in order to trigger a wireless response from the target mobile device 8. The trigger node 18 is configured to transmit the trigger packets under control of a controller 19, which may for example be implemented at the trigger node 18 or the location server 14, or elsewhere. This controller 19 may be implemented in software stored in one or more memories of the server 14, trigger node 18 and/or other node and arranged for execution on one or more processors of the server 14, trigger node 18 and/or other node; or may be implemented in dedicated hardware circuitry, or in configurable or reconfigurable circuitry such as a PGA or FPGA, or any combination of these possibilities.

Each trigger packet may be broadcast to any devices that are in range including the target mobile device(s) 8, or alternatively each trigger packet may be addressed to a specific target mobile device 8 which the trigger node 8 has detected within the environment 2. Either way, this triggers a response to be emitted by the mobile device 8 in order to act like a beacon by which the location of the mobile device 8 can be detected by the location network 4. This response by the mobile device 8 may be broadcast or may be addressed to the trigger node 18. In the latter case, the response will still be detectable by at least some of the listening anchor nodes 6 in the environment 2, which in embodiments are configured to "sniff" for any signals from the mobile device 8 even if not addressed to them (as will be discussed in more detail shortly).

In principle, any communication node in the network could act as the trigger node 18. For instance, one possible choice for a WiFi network would be to configure the access point (AP) 12 (or one of multiple APs) to act as the trigger node 18, since all the data traffic will pass through the AP anyway in the infrastructure mode. I.e. in embodiments the trigger node 18 comprises an access point for providing user devices such as the mobile device 8 with access to a further, communications network such as the internet via the same wireless access technology (e.g. Wi-Fi or ZigBee) that is used to transmit the trigger signal. Note therefore that although elements 12 and 18 are shown separately in the schematic illustration of FIG. 3, in embodiments they may in fact be incorporated in the same unit and represent different functions of that same node. Alternatively, it is not excluded that the trigger node 18 could indeed be a separate node, i.e. a node other than the AP or gateway 12, e.g. a dedicated trigger node introduced solely for that purpose, or another type of node such as a Wi-Fi, ZigBee or Bluetooth equipped luminaire.

In embodiments, the trigger node 18 is configured (under control of its controller 19) to send the trigger packets at regular intervals, i.e. periodically, such that all the sniffer nodes 6 also can obtain RSSIs with a regular interval. Such regular collection of RSSIs can offer more stable and smooth location results than based on the traffic of a burst pattern, such as the natural traffic patterns that are commonly initiated by mobile devices. Further, in embodiments, the duration of the interval may be arranged to have a direct correlation with the achievable positioning performance in terms of accuracy and delay, etc. In some particularly advantageous embodiments, the duration of the interval can be adapted based on positioning performance requirements such as accuracy and/or delay. For instance, in an emergent situation, a higher accuracy or lower delay is needed than normal situations to determine the location of a mobile device, and the transmission interval between the trigger signals is shortened, so that more RSSI measurements can be obtained within a relatively shorter time.

The mobile device 8 comprises a local controller 9 which may be implemented in software stored in one or more memories of the mobile device 8 and arranged for execution on one or more processors of the mobile device, or may be implemented in dedicated hardware circuitry, or in configurable or reconfigurable circuitry such as a PGA or FPGA, or any combination of these possibilities. The controller 9 is configured to recognize the trigger message sent from the trigger node 18 when received by the mobile device, and to react accordingly by controlling the mobile device 8 to wirelessly emit a signal in response whenever the trigger message is received from the trigger node 18. If the trigger signal is transmitted regularly, this will cause the mobile device 8 to emit the response signal in response to each trigger packet and therefore to respond with the response signal at substantially regular intervals as well.

In one example implementation, the trigger message may be transmitted in the form of an ICMP (Internet Control Message Protocol) message initiated by a network "ping" command for a Wi-Fi network, executed at the controller 19 of the trigger node 18. In this case the response signal from the mobile device 8 takes the form of a ping response message. However, it will be appreciated this is just one example, and in other embodiments other use methods such as TPC request/report can be used.

In embodiments, the "sniffer" nodes 6 are in fact normal and/or pre-existing wireless communication client nodes in the network that are configured with an additional "sniffing" functionality. According to this functionality, each sniffer node 6 listens to the response messages from the mobile device 8 to the trigger node 18, and estimates the respective signal strengths (RSSIs) at the respective sniffer node 6.

Consider a wirelessly connected system with a lot of nodes 6 in the system. These nodes 6 are deployed around various places in the environment 2, and are able to communicate wirelessly with each other via WiFi, ZigBee or the like. For example these nodes 6 could be wirelessly connected lamps, access points, computers, wireless speakers, etc. These nodes 6 are of fixed and known locations. Each of them may have their own pre-existing purpose for being equipped with their wireless communication capabilities (e.g. Wi-Fi or ZigBee), such as to allow wireless control of the colour and/or dimming level of the emitted light in the case where the nodes comprise lamps. In embodiments, this wireless capability of the nodes 6 is exploited such that they are also used to act as anchor nodes for the purpose of localization. However, localization need not be the primary purpose for which they are equipped with wireless communication capability (e.g. Wi-Fi or ZigBee) and in embodiments it is indeed not the primary purpose. Note also that in embodiments, some or all of the nodes 6 used as anchor nodes are not access points (APs), i.e. do not provide user devices such as the mobile device 8 with wireless access to any further communication network such as the Internet (e.g. instead they are luminaires with wireless capability). Alternatively it is not excluded that some or all of these nodes 6 could be access points.

Note, the concept of an AP only applies to the example of Wi-Fi systems. However, the scope of the present disclosure is not limited to any particular radio technology. More generally, any of the involved nodes, including the trigger node, the mobile device, the anchor node, the aggregation node, etc., can be a normal station, or wireless client node.

Figure 4:
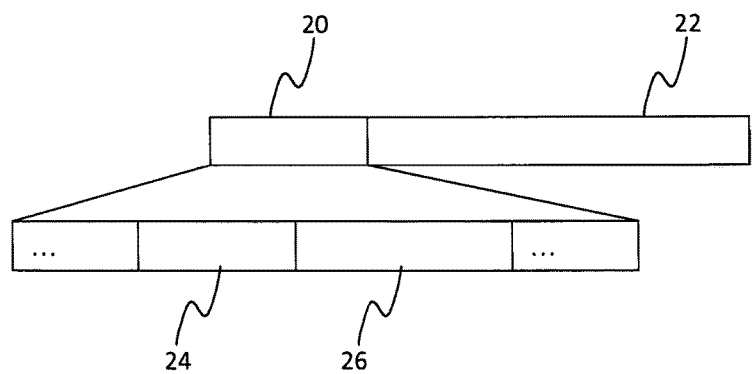
FIG. 4 is a schematic block diagram of a message format.

Each communication node 6 has a unique identification (ID), such as an IP address or MAC address, or the like. A common practice for each communication node 6 to receive data is as follows. As illustrated in FIG. 4, typically each transmitted packet comprises a header 20 and a payload 22. The header 20 comprises a source ID 24 being the ID of the source of the packet source, and a destination ID 26 being the ID of the destination of the packet. Each communication node listens to the radio waves in the environment 2. Once each node receives a packet, it checks whether the destination ID is the ID of itself. If yes, then the communication node decodes the rest of the data inside the packet payload 22. If not, then the node simply discards the packet or forwards the packets to other nodes, without looking into the rest the packet.

In embodiments, the "sniffing" can be implemented in the listening nodes 6 by changing the normal receiving strategy, as follows. Once seeing a packet, irrespective of the destination ID, each listening node 6 checks the source ID in the packet header and estimates the receive signal strength (e.g. RSSI) based on the packet header 20 or the entire packet 20, 22, without decoding the rest of the packet. The rest of the data packet may be encrypted anyway and not understandable for a node 6, if the destination ID is not same as that node 6. However, the listening node 6 does not need to understand the content, but rather only measure the received signal strength. In this manner, each sniffer node 6 behaves as an anchor node and it can collect the RSSIs with respect to any mobile device 8 even if there is no direct communication between the mobile device 8 and the listening node 6 (i.e. even if the mobile device 8 does not specifically address any communication to the listening node 6). In this sense, the listening node 6 may be said to "sniff" for combinations from the mobile device 8, even if not intended for it.

N.B. in conventional location systems, the device emits a beacon signal which is broadcast, i.e. not addressed to any specific destination. However, in embodiments of the present disclosure, the response signal from the mobile device may not be a broadcast signal, but rather is addressed to a specific destination, e.g. the trigger node—but nonetheless, the anchor nodes 6 (referenced nodes) are configured to listen for the signal anyway even though not addressed to them. Therefore, the word "sniffer" may be used herein to refer to the reference nodes.

The RSSIs from various different sniffer nodes 6 are sent by the respective sniffer nodes 6 to an aggregation node 28. The role of the aggregation node 28 is to collect all the RSSIs from all the sniffer nodes 6 that detect a signal from the mobile device, and to send them to the location engine 30 to actually compute the locations of the mobile device (s) 8. The aggregation node 28 may be any suitable node of the network, whether a dedicated aggregation node introduced for that purpose, or one of the other nodes already described such as an access point 12 or the trigger node 18 or other some other node (thus although labelled and/or shown separately in the schematic illustrations of FIGS. 3 and 5, in embodiments elements 28 and 12 and/or 18 may represent different functions incorporated in the same unit).

Various different location algorithms can be used at the location engine 30, such as trilateration, fingerprinting, or radio zoning, etc.; based on any suitable measurements such as RSSI or time-of-flight. Note also, the localization need only be based on at least some of the measurements from nodes that hear the response (i.e. it doesn't necessarily have to use all available measurements).

In embodiments, the trigger node 18 and the listening (sniffer) anchor nodes 6 are distinct types of node. The trigger node 18 may be separate from the listening nodes 6, in that the trigger node 18 does not take any of said measurements of the triggered response signal from the mobile device 8, and the listening nodes 6 do not send any trigger signal that would cause the mobile device 8 to emit the response signal; or the trigger node 18 may also acts as one of the listening nodes 6, but the rest of the listening nodes 6 do not send any trigger signal that would cause the mobile device 8 to emit the response signal.

The system diagram is illustrated in FIG. 5, where solid-line connections indicate a "real" target communication link (to an addressed destination) while dashed lines indicate a sniffing communication link (not to the addressed destination).

In embodiments, the signal emitted by the mobile device 8 in response to the trigger is a dedicated signal for the purpose of localization, i.e. it does not contain any user content, nor any control information other than for the purpose of localization.

Preferably, the mobile device 8 is configured (under control of its controller 9), so that it will only transmit the response signal in response to receiving the trigger signal from the trigger node 18, and not otherwise. This way the external control of the emissions triggered by the trigger node 18 can not only ensure there are sufficient messages for location, but also that there are not too many messages being transmitted which could otherwise cause congestion over the wireless network.

Note also that in embodiments, the sniffer nodes 6 are not limited to only detecting and taking measurements of the response signal sent from the mobile device 8 in response to the trigger signal from the trigger node 18. Rather, the mobile device 8 may transmit other traffic in the form of user content and/or control signals transmitted for purposes other than localization (which traffic does not have to wait to be triggered by the trigger signal); and the sniffer nodes 6 are preferably configured to detect and take measurements of any signal from the mobile device 8 including such other non-localization traffic, and to report these to the location engine 30 (via aggregation node 28) to be included in the localization calculation. I.e., the signal measurements for use in the localization are taken from both natural traffic and triggered traffic.

In further embodiments, the system may be arranged to implement a degree of cooperation between the trigger node 18 and sniffer nodes 6. In this case, the sniffer nodes 6 are arranged to receive an indication from the controller 19 of the trigger node 18 indicating when the trigger signal has been sent to the mobile device 8. Based on this, the sniffer nodes 6 are configured so that they only "sniff" for messages within a short time window soon after a trigger message is sent by the trigger node 18. For the rest of time, the sniffing nodes are configured to switch off to a power-save mode. This provides an intelligent search strategy by which only devices 8 that didn't recently communicate are triggered. Thus by cooperating between the trigger node 18 and sniffer nodes 6, additional power saving can be achieved.

In yet further embodiments, the system is arranged to detect a proximity of the mobile device 8 to some other entity, and the trigger node 18 is configured (under control of its controller 19) to wirelessly transmits said trigger signal to the mobile device in response to detecting that the mobile device 8 is within a predetermined proximity of the other entity (and in embodiments only in response to this). For example the other entity could be a presence sensor (not shown) such as an infrared sensor or ultrasound sensor for detecting that the user 10 is proximate to the sensor, with the presence sensor being located near the trigger node 18 or at a central or otherwise representative location amongst the sniffer nodes 6 such that proximity to the presence sensor indicates the mobile device 8 is in a suitable place for a localization to be performed based on the sniffer nodes 6 in the environment 2 in question. As another example, the location engine 30 may be configured to obtain an initial, rough location based on previous measurements, perhaps including extrapolating the path of the mobile device from base localizations, and this may be used to determine proximity between the mobile device 8 and the trigger node 18 or one or more of the sniffer nodes 6. By whatever means the proximity detection is achieved, when the mobile device 8 is known to be proximate to the other "landmark" entity, then the trigger node 8 starts measurements by triggering devices 8 in proximity to the landmark entity. This may be performed in a manner so as to allow fast triangulation, trilateration or the like—e.g. once RSSI data from two sniffer nodes 6 are known, the location engine 30 picks a third based on known topology and RSSI1 and RSSI2.

It will be appreciated that the above embodiments have been described only by way of example.

In accordance with everything discussed above, the techniques disclosed herein advantageously introduce a trigger node into a wireless network in order to aid localization. Various concepts have been disclosed, including: (i) nodes in the network, look at communications in the network (also those not intended for them) to determine RSSI measurements to other nodes, and these RSSI values are combined to determine relative position; (ii) a trigger node sends trigger messages to other nodes to trigger responses (the trigger also performs RSSI measurement) and determines RSSI to other nodes; and (iii) both can be advantageously combined because then you can "tune" the messages of the trigger device to only trigger responses from devices that are e.g. not active. In embodiments technique (i) can be used alone, or even more advantageously in combination with (ii) or (ii) and (iii).

Further, note that although the above has been disclosed in terms of certain wireless communications standards such as Wi-Fi and ZigBee, these are not limiting and the localization techniques disclosed herein can be implemented using any wireless standard or proprietary wireless protocol. Further, the scope of the disclosure is not limited to any one particular type of localization calculation, and various examples will in themselves be appreciated by a person skilled in the art, e.g. triangulation, trilateration, multilateration, or fingerprinting. Nor is the scope of the disclosure limited to using RSSI or other measure of received signal strength as the measurements for performing localization, and other types of measurement are possible, such as time-of-flight.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining a location of a mobile device, the method comprising:
as at least part of a location network, providing a trigger node for transmitting wirelessly to the mobile device, and providing multiple listening nodes for receiving wirelessly from the mobile device;
using an entity in the form a presence sensor to detect that a user of the mobile device is within a predetermined proximity of the presence sensor;
using the trigger node to wirelessly transmit a trigger signal to the mobile device in response to detecting that the user is within the predetermined proximity of said presence sensor, the trigger signal being configured to cause the mobile device to wirelessly emit a signal in response to receiving the trigger signal; and
using the listening nodes to listen for the response signal that was transmitted from the mobile device in response to the trigger signal, and thereby at each respective one of a plurality of the listening nodes that wirelessly receive the response signal from the mobile device, taking a respective measurement of the response signal as received at the respective listening node, for use in performing a localization to determine the location of the mobile device based on one or more of said measurements,
wherein the mobile device wirelessly emits one or more other signals in addition to said response signal, and each of the listening nodes are used to listen for the response signal and said other signals even if not addressed to the listening node, in order to take respective measurements of the response signal and at least one of the other signals for use in performing said localization.

2. The method of claim 1, wherein the response signal from the mobile device is a dedicated signal for the purpose of localization.

3. The method of claim 1, wherein the response signal is emitted from the mobile device only when triggered by said trigger signal.

4. The method of claim 1, wherein the response signal from the mobile device is addressed to a target destination, and the listening nodes are not the target destination of the response signal.

5. The method of claim 1, wherein:
the trigger node is separate from the listening nodes, in that the trigger node does not take any of said measurements of the response signal from the mobile device, and the listening nodes do not send any trigger signal that would cause the mobile device to emit the response signal; or
the trigger node also acts as one of the listening nodes, but the rest of the listening nodes do not send any trigger signal that would cause the mobile device to emit the response signal.

6. The method of claim 1, wherein the transmission by the trigger node and the reception by the listening nodes is performed according to a Wi-Fi protocol, and the trigger signal is an Internet Control Message Protocol (ICMP) message transmitted in response to a ping command.

7. The method of claim 1, wherein the trigger node is used to wirelessly transmit the trigger signal to the mobile device in response to determining that the mobile device has not emitted any of said other signals within a predetermined time window.

8. Apparatus comprising:
a controller configured to use a presence sensor to detect that a user of a mobile device is within a predetermined proximity of the presence sensor, and to control a trigger node to wirelessly transmit a trigger signal to the mobile device in response to detecting that the user is within the predetermined proximity the presence sensor, the trigger signal being configured to cause the mobile device, in response to receiving the trigger signal, to wirelessly emit a response signal to be received by a plurality of listening nodes of a location network; and
a location engine configured to receive respective measurements of the response signal as received at least some said plurality of listening nodes, and to perform a localization to determine the location of the mobile device based on one or more of said measurements, wherein:
the mobile device wirelessly emits one or more other signals in addition to the response signal;
each of the listening nodes listen for the response signal and said other signals even if not addressed to the listening node, in order to take respective measurements of the response signal and at least one of the other signals for use in performing said localization; and
the controller is configured to control the trigger node to wirelessly transmit the trigger signal to the mobile device in response to determining that the mobile device has not emitted any of said other signals within a predetermined time window.

9. A location network for determining a location of a mobile device, the location network comprising:
a presence sensor configured to detect that a user of the mobile device is within a predetermined proximity of the presence sensor;
a trigger node configured to wirelessly transmit a trigger signal to the mobile device in response to detecting that the user is within the predetermined proximity of said presence sensor, the trigger signal being configured to cause the mobile device to wirelessly emit a response signal in response to receiving the trigger signal; and multiple listening nodes configured to listen for the response signal being transmitted from the mobile device in response to the trigger signal, and at each respective one of a plurality of the listening nodes that wirelessly receive the response signal from the mobile device, to thereby take a respective measurement of the response signal as received at the respective listening node; and a location engine configured to perform a localization to determine the location of the mobile device based on one or more of said measurements, wherein the mobile device wirelessly emits one or more other signals in addition to said response signal, and each of the listening nodes are used to listen for the response signal and said other signals even if not addressed to the listening node, in order to take respective measurements of the response signal and at least one of the other signals for use in performing said localization.

10. A computer program stored on one or more non-transitory computer-readable storage media, and configured, when executed on one or more processors, to perform a method of determining a location of a mobile device, the method comprising:

using a presence sensor to detect that a user of the mobile device is within a predetermined proximity of the presence sensor;

controlling a trigger node to wirelessly transmit a trigger signal to the mobile device in response to detecting that the user is within the predetermined proximity of said presence sensor, the trigger signal being configured to cause the mobile device, in response to receiving the trigger signal, to wirelessly emit a response signal to be received by a plurality of listening nodes of a location network; and using the listening nodes to listen for the response signal that was transmitted from the mobile device in response to the trigger signal, and thereby at each respective one of a plurality of the listening nodes that wirelessly receive the response signal from the mobile device, taking a respective measurement of the response signal as received at the respective listening node, for use in performing a localization to determine the location of the mobile device based on one or more of said measurements, wherein the mobile device wirelessly emits one or more other signals in addition to said response signal, and each of the listening nodes are used to listen for the response signal and said other signals even if not addressed to the listening node, in order to take respective measurements of the response signal and at least one of the other signals for use in performing said localization.

* * * * *